(12) United States Patent
Noble

(10) Patent No.: US 8,614,946 B1
(45) Date of Patent: Dec. 24, 2013

(54) DYNAMIC SWITCH PORT MONITORING

(71) Applicant: Steven O. Noble, San Jose, CA (US)

(72) Inventor: Steven O. Noble, San Jose, CA (US)

(73) Assignee: Sideband Networks Inc., Sunnyvale, CA (US)

( * ) Notice: Subject to any disclaimer, the term of this patent is extended or adjusted under 35 U.S.C. 154(b) by 0 days.

(21) Appl. No.: 13/912,223

(22) Filed: Jun. 7, 2013

(51) Int. Cl.
*G01R 31/08* (2006.01)

(52) U.S. Cl.
USPC ......... 370/230.1; 370/244; 370/250; 709/226

(58) Field of Classification Search
USPC ........................ 370/241, 250–253, 229–240
See application file for complete search history.

(56) References Cited

U.S. PATENT DOCUMENTS

| | | | |
|---|---|---|---|
| 6,041,042 A | | 3/2000 | Bussiere |
| 6,801,940 B1 * | | 10/2004 | Moran et al. ................... 709/224 |
| 6,823,383 B2 | | 11/2004 | MacBride |
| 6,898,632 B2 | | 5/2005 | Gordy et al. |
| 7,209,476 B1 | | 4/2007 | Colloff et al. |
| 7,292,573 B2 | | 11/2007 | LaVigne et al. |
| 7,299,277 B1 * | | 11/2007 | Moran et al. ................... 709/224 |
| 7,308,705 B2 | | 12/2007 | Gordy et al. |
| 7,391,739 B1 | | 6/2008 | Taylor et al. |
| 7,486,674 B2 | | 2/2009 | Regan |
| 7,505,416 B2 | | 3/2009 | Gordy et al. |
| 7,760,859 B2 | | 7/2010 | Matityahu et al. |
| 7,774,440 B1 * | | 8/2010 | Bagrodia et al. ............... 709/221 |
| 7,792,046 B2 | | 9/2010 | Kucharczyk et al. |
| 7,809,476 B2 | | 10/2010 | Cicchetti et al. |
| 7,876,792 B2 * | | 1/2011 | Wong et al. ................... 370/518 |
| 7,898,984 B2 | | 3/2011 | Matityahu et al. |
| 7,936,685 B2 | | 5/2011 | Kucharczyk |
| 8,094,576 B2 | | 1/2012 | Matityahu et al. |
| 8,095,683 B2 | | 1/2012 | Balasubramaniam Chandra |
| 8,233,388 B2 | | 7/2012 | Zheng et al. |
| 8,239,960 B2 | | 8/2012 | Frattura et al. |
| 8,284,657 B1 | | 10/2012 | Reynolds et al. |
| 8,295,188 B2 | | 10/2012 | Elrod |
| 8,320,242 B2 | | 11/2012 | Matityahu et al. |
| 2001/0055274 A1 | | 12/2001 | Hegge et al. |
| 2004/0003094 A1 | | 1/2004 | See |
| 2004/0196841 A1 | | 10/2004 | Tudor et al. |
| 2005/0129033 A1 | | 6/2005 | Gordy et al. |
| 2005/0265248 A1 * | | 12/2005 | Gallatin et al. ............... 370/250 |
| 2006/0059163 A1 | | 3/2006 | Frattura et al. |
| 2007/0192526 A1 | | 8/2007 | Sharma et al. |
| 2009/0168648 A1 | | 7/2009 | Labovitz et al. |
| 2012/0042164 A1 | | 2/2012 | Gagnon et al. |
| 2012/0082162 A1 | | 4/2012 | Li et al. |
| 2012/0167168 A1 | | 6/2012 | Orr et al. |
| 2012/0307684 A1 | | 12/2012 | Biswas et al. |

* cited by examiner

*Primary Examiner* — Ayaz Sheikh
*Assistant Examiner* — Mounir Moutaouakil

(57) ABSTRACT

Disclosed are methods and system to dynamically monitor a number of switching ports of a networking device. In one embodiment, a system is disclosed to monitor network traffic comprising a switch port monitoring device comprising a real-time processor, a packet data processor, a packet queue and a storage device. The system also comprises one or more switches coupled to the switch port monitoring device, where at least one of the switches comprising a switch processor, a switch fabric, one or more ingress/egress ports coupled to the switch fabric, and one or more uplink ports coupling the switch packet to the packet queue of the switch port monitoring device.

18 Claims, 7 Drawing Sheets

TABLE 300

| INGRESS/EGRESS PORT | 114A | 114B | 114C | 114D | 114E | 114F | 114G | 114H | 114I |
|---|---|---|---|---|---|---|---|---|---|
| TRAFFIC RATE AS PERCENTAGE OF MAXIMUM UPLINK LINE RATE | 35% | 50% | 68% | 11% | 14% | 27% | 85% | 10% | 40% |

TABLE 302

| UPLINK PORT | COMBINATION | TRAFFIC RATE AS PERCENTAGE OF MAXIMUM UPLINK LINE RATE |
|---|---|---|
| 116A | PORTS 114A + 114B | 85% |
| 116B | PORTS 114C + 114D | 79% |
| 116C | PORTS 114E + 114F + 114H + 114I | 91% |
| 116D | PORT 114G | 85% |

TABLE 304

| UPLINK PORT | COMBINATION | TRAFFIC RATE AS PERCENTAGE OF MAXIMUM UPLINK LINE RATE |
|---|---|---|
| 116A | PORTS 114A + 114B | 85% |
| 116B | PORTS 114C + 114D | 79% |
| 116C | PORTS 114E + 114F + 114I | 81% |
| 116D | PORT 114G | 85% |

FIGURE 3A

TABLE 306

| INGRESS/EGRESS PORT | 114A | 114B | 114C | 114D | 114E | 114F | 114G | 114H | 114I |
|---|---|---|---|---|---|---|---|---|---|
| TRAFFIC RATE AS PERCENTAGE OF MAXIMUM UPLINK LINE RATE | 35% | 50% | 60% | 8% | 14% | 27% | 85% | 20% | 40% |

TABLE 308

| UPLINK PORT | COMBINATION | TRAFFIC RATE AS PERCENTAGE OF MAXIMUM UPLINK LINE RATE |
|---|---|---|
| 116A | PORTS 114A + 114B | 85% |
| 116B | PORTS 114C + 114D + 114H | 88% |
| 116C | PORTS 114E + 114F + 114I | 81% |
| 116D | PORT 114G | 85% |

FIGURE 3B

DYNAMIC SWITCH PORT MONITORING

INCORPORATION BY REFERENCE

This application incorporates by reference U.S. Pat. No. 8,441,961 titled: "METADATA-DRIVEN SWITCH NETWORK CONTROL," filed on Dec. 24, 2012; U.S. Pat. No. 8,448,238 titled: "NETWORK SECURITY AS A SERVICE USING VIRTUAL SECURE CHANNELS," filed on Jan. 23, 2013; U.S. Pat. No. 8,438,631 titled: "SECURITY ENCLAVE DEVICE TO EXTEND A VIRTUAL SECURE PROCESSING ENVIRONMENT TO A CLIENT DEVICE," filed on Jan. 24, 2013; and U.S. patent application Ser. No. 13/861,365 titled: "DYNAMIC ALLOCATION OF RESOURCES AND DISTRIBUTION OF CONFIGURATIONS OVER A NETWORK," filed on Apr. 11, 2013, in their entirety.

FIELD OF TECHNOLOGY

This disclosure relates generally to networking technology, in one example embodiment, to methods, apparatus, and systems to dynamically monitor a number of switching ports of a networking device.

BACKGROUND

A data intensive organization in today's information rich technological environment may transfer upwards of several TBs of traffic per second over its network. In order to ward against forwarding potentially harmful traffic, network device manufacturers have developed certain tools to monitor the ingress and egress of data packets making their way through such devices. Common tools include user configurable port tapping or monitoring. Oftentimes, each active network port is mirrored to one tap port. While such a 1:1 mirroring relationship may be easier to maintain when the flow of network traffic is low, the inefficiency of this particular system is quickly exposed when the flow of network traffic increases. In the case where the amount of ingress traffic at the active ports exceeds the bandwidth of the monitoring ports, one or more data packets may be dropped before they are examined. This is especially troublesome if a threat agent (for example, a computer virus) can only be detected if a protracted series of packets must all be present for the network device to realize that an attack is in progress. In such a case, the inadvertent dropping of one or two critical packets may leave the network vulnerable.

Moreover, even if the amount of traffic arriving at the active ports does not exceed the bandwidth of the monitoring ports, the deployment of a static 1:1 mirroring scheme may be inefficient as no monitoring or tap ports would be operating at near line-rate. In addition, most network monitoring solutions do not base their monitoring decisions on historical network traffic data or account for future spikes in network traffic.

Therefore, a networking monitoring solution is needed that can handle the fluctuations of today's unpredictable network traffic by utilizing both historical and real-time knowledge of ingress network traffic patterns and the capacity constraints of all monitoring tools available.

SUMMARY

Disclosed are methods, apparatus, and systems to dynamically monitor a number of switching ports of a networking device. As disclosed herein, a machine-implemented method to dynamically monitor network traffic is disclosed comprising: queuing one or more packets received from one or more uplink ports of a switch fabric in a packet queue; querying, by a real-time processor, the packet queue for a queuing status of the packet queue and querying the monitoring load of a packet data processor analyzing the one or more packets received from the packet queue; determining, by the real-time processor, an objective specific model that optimizes the number of packets forwarded to the packet queue or the rate of packet data forwarded to the packet queue as a result of the queries; and commanding a switch processor and the switch fabric, through a control engine of the real-time processor, to deploy the objective specific model.

In this aspect, the method may further comprise commanding, through the control engine of the real-time processor, the switch processor to tag a packet flow if one or more packets in the packet flow have been analyzed by the packet data processor and commanding, through the control engine of the real-time processor, the switch fabric to exclude the packet flow or the one or more packets of the packet flow tagged by the switch processor from being forwarded to the packet queue. The method may also comprise storing the objective specific model in a storage device communicatively coupled to the real-time processor as a cached objective specific model. In certain instances, the cached objective specific model may be deployed to optimize the number of packets forwarded to the packet queue or the rate of packet data forwarded to the packet queue.

In this aspect, the switch fabric may comprise one switch fabric or one switch fabric coupled to another switch fabric. Additionally, the queuing status of the packet queue may comprise data relating to the number of packets in the packet queue and/or the rate of packet data added to the packet queue. The method may further comprise querying the monitoring load of the packet data processor by receiving, from the packet data processor, feedback data comprising the bits per second analyzed by the packet data processor and/or the packets per second analyzed by the packet data processor.

In this aspect, commanding the switch processor of the switch fabric to deploy the objective specific model may comprise updating one or more entries in a switch forwarding table. Moreover, the objective specific model deployed may comprise a networking model that forwards packets from two or more ingress ports of the switch fabric to one uplink port. Finally, the one or more packets received from the one or more uplink ports of the switch fabric may be copies of packets received at one or more ingress ports of the switch fabric.

Another aspect of the disclosure may include a system to dynamically monitor network traffic. In this aspect, the system comprises a switch port monitoring device comprising a real-time processor, a packet data processor, a packet queue, and a storage device; one or more switches, coupled to the switch port monitoring device, with at least one of the aforementioned switches comprising a switch processor, a switch fabric, one or more ingress/egress ports coupled to the switch fabric, and one or more uplink ports coupling the switch fabric to the packet queue of the switch port monitoring device; and a plurality of programs stored in a plurality of memory devices and executable by at least one of the aforementioned processors.

In this aspect, such programs may comprise instructions to implement the methods described heretofore.

The methods and systems disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and are not limited to the figures of the accompanying drawings, in which, like references indicate similar elements.

FIGS. 3A and 3B are port configuration tables that illustrate the dynamic monitoring of one or more switching ports of a networking device, according to one or more embodiments.

Figure 1:
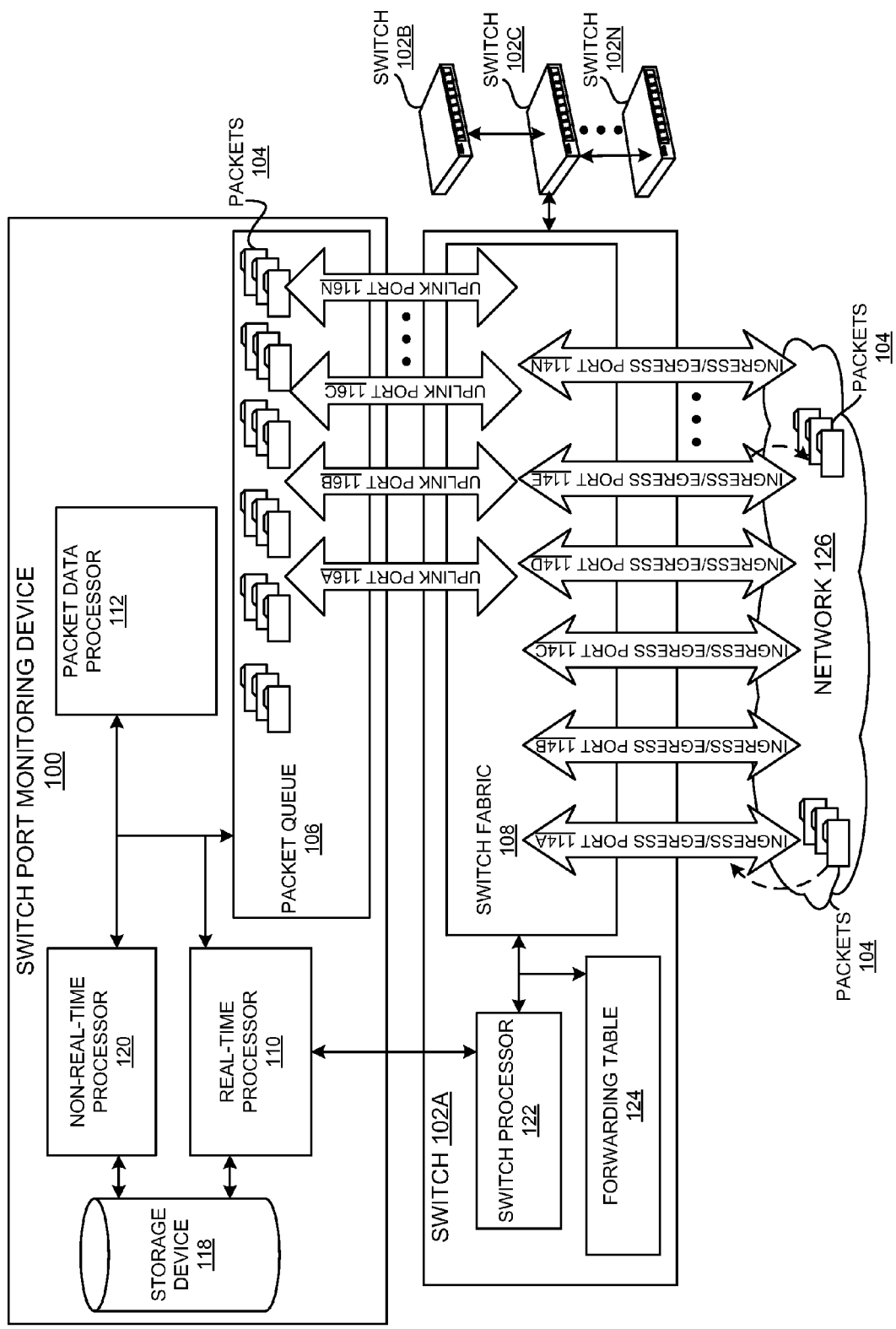
FIG. 1 is a schematic diagram illustrating a system to dynamically monitor one or more switching ports of a networking device, according to one or more embodiments.

Other features of the present embodiments will be apparent from the accompanying drawings and from the detailed description that follows.

DETAILED DESCRIPTION

Disclosed are methods, apparatus, and systems to dynamically monitor network traffic in a fast and efficient manner. Although the present embodiments have been described with reference to specific example embodiments, it will be evident that various modifications and changes may be made to these embodiments without departing from the broader spirit and scope of the various embodiments. It should be understood by one of ordinary skill in the art that the terms "application(s)," "program(s)," "software," "software code," "sub-program(s)," "module(s)," and "block(s)" are industry terms that refer to computing instructions stored in memory and executable by one or more processors. In addition, the components shown in the figures, their connections, couples, and relationships, and their functions, are meant to be exemplary only, and are not meant to limit the embodiments described herein.

In one embodiment, a machine-implemented method is disclosed to dynamically monitor network traffic in a fast and efficient manner. In this embodiment, the method comprises queuing one or more packets 104 received from one or more uplink ports 116A-N of a switch fabric 108 in a packet queue 106; querying, by a real-time processor 110, the packet queue 106 for a queuing status of the packet queue 106 and the monitoring load of a packet data processor 112 configured to analyze the one or more packets 104 received from the packet queue 106; determining, by the real-time processor 110, an objective specific model 200 that optimizes at least one of the number of packets forwarded to the packet queue 106 and the rate of packet data forwarded to the packet queue 106 as a result of the queries; and commanding, through a control engine 212 of the real-time processor 110, a switch processor 122 and the switch fabric 108 to deploy the objective specific model 200.

In one or more embodiments, the method may further comprise commanding, through the control engine 212 of the real-time processor 110, the switch processor 122 to tag a packet flow if one or more packets in the packet flow have been analyzed by the packet data processor 112 and commanding, through the control engine 212 of the real-time processor 110, the switch fabric 108 to exclude at least one of the packet flow and the one or more packets 104 of the packet flow tagged by the switch processor 122 from being forwarded to the packet queue 106.

In one or more embodiments, the method may further comprise storing the objective specific model 200 in a storage device 118 communicatively coupled to the real-time processor 110 as a cached objective specific model. In this or other embodiments, the method may further comprise deploying the cached objective specific model to optimize at least one of the number of packets 104 forwarded to the packet queue 106 and the rate of packet data forwarded to the packet queue 106.

In this or other embodiments, the switch fabric 108 may be one switch fabric of a single switch (for example, switch 102A) or may be comprised of one switch fabric coupled to another switch fabric of another switch (for example, switch 102B). In addition, the queuing status of the packet queue 106 may comprise data relating to the number of packets in the packet queue 106 and the rate of packet data added to the packet queue 106. Moreover, the method may comprise querying the monitoring load of the packet data processor 112 by receiving, from the packet data processor 112, feedback data comprising at least one of the bits per second analyzed by the packet data processor 112 and the packets per second analyzed by the packet data processor 112.

In one or more embodiments, the method may further comprise commanding the switch processor 122 and the switch fabric 108 to deploy the objective specific model 200 by updating one or more entries in a forwarding table 124. In this or other embodiments, the objective specific model 200 deployed may comprise a networking model that forwards packets 104 from at least two ingress ports (for example, ingress/egress ports 114A and 114B) of the switch fabric 108 to one uplink port (for example, uplink port 116A). Finally, the one or more packets received from the one or more uplink ports 114A-114N of the switch fabric 108 may be copies of the packets 104 received at one or more ingress ports (for example, any of the indicated ingress/egress ports 114A-114N) of the switch fabric 108.

Reference is now made to FIG. 1, which is a schematic diagram illustrating an example system that may be used to implement the methods disclosed herein. In one embodiment, the system comprises a switch port monitoring device 100 comprising a real-time processor 110, a non-real-time processor 120, a storage device 118 communicatively coupled to the real-time processor 110 and the non-real-time processor 120, a packet data processor 112, and a packet queue 106. As shown in the example embodiment in FIG. 1, the packet queue 106 may be coupled to a switch fabric 108 of a networking device or a network switch device (for example, switch 102A) through one or more uplink ports 116A-116N. In one embodiment, the one or more uplink ports 116A-116N may be Ethernet ports capable of transmitting multiple gigabits of network traffic per second (e.g., 10 Gigabits per second (Gbps) XAUI ports) or lanes of such Ethernet ports. In another embodiment, the uplink ports 116A-116N may comprise SGMI ports multiplexed with XAUI ports. In one or more embodiments, the uplink ports 116A-116N may be designed according to applicable IEEE networking standards (for example, IEEE 1588v2 on precision timing or IEEE 802.1Qbb on priority flow control). In this or another embodiment, the uplink ports 116A-116N may be coupled to one another, the packet queue 106, and the switch fabric 108 through techniques and resources defined in IEEE 802.3 on 10 Gigabit Media Independent Interfaces (XGMII).

In one or more embodiments, each of the real-time processor 110, the packet data processor 112, and the non-real-time processor 120 may comprise of one or more processor cores operating at 1.0 to 1.2 Gigahertz (GHz). In one embodiment, each such processor core may be designed according to a 64-bit architecture and may comprise L1, L2, and/or L3 caching capabilities. In particular, each core may comprise up to 32 kilobytes (KB) of L1 cache, 256 KB of L2 cache, and 18 MB of L3 cache. In one embodiment, each of the cores may comprise a memory that may be implemented as either volatile memory (for example, dynamic random access memory (DRAM) or static random access memory (SRAM)) or non-volatile memory (for example, non-volatile random access memory). In a further embodiment, the cores may share one or more memory devices. In this or another embodiment, the memory in such cores may comprise any form of computer-readable medium configured to store one or more computer programs in the form of instructions executable by the aforementioned processors. In this or another embodiment, the real-time processor 110, the packet data processor 112, the packet queue 106, and the non-real-time processor 120 may be interconnected by high speed buses.

In one or more embodiments, the packet queue 106 may be an application specific integrated circuit (ASIC) comprising one or more processor cores and on-chip memory (for example: SRAM, DRAM, etc.) coupled to such processor cores. In this or another embodiment, the packet queue may be C-programmable and may provide checksum and redundancy check functions for packet headers and payloads. In addition, the packet queue 106 may provide load balancing and buffer management functionalities. In a further embodiment, the packet queue 106 may comprise one or more processing cores of the switch port monitoring device 100 and may share memory with the other processors embedded in the switch port monitoring device 100. In yet a further embodiment, the packet queue 106 may be a packet queue program stored in a memory or storage device of the switch port monitoring device 100 and executable by one or more processors of the switch port monitoring device 100.

In one embodiment, the entire switch port monitoring device 100 may be implemented as an ASIC comprising multiple processor cores, storage devices, and memory devices. In another embodiment, the switch port monitoring device 100 may be or may be integrated into networking device (a switch, router, etc.). In yet another embodiment, the switch port monitoring device 100 may be or may be integrated into a data processing device (e.g., laptop, desktop, workstation, server, etc.).

As shown in the example embodiment illustrated in FIG. 1, the switch port monitoring device 100 may be coupled to the switch 120A through a high-speed expansion bus. In one embodiment, the switch port monitoring device 100 may be coupled to the switch 120A through a Peripheral Component Interconnect Express (PCIe) interface. The PCIe interface used may be a version 2.0, 3.0, or 4.0 interface. In one or more embodiments, the PCIe interface may couple a motherboard comprising the real-time processor 110 to another motherboard comprising the switch processor 122. As indicated in the example embodiment shown in FIG. 1, the switch 102A may be one switch coupled or communicatively coupled to a network of switches comprising switches 102B-102N. In other embodiments not shown in FIG. 1, the switch port monitoring device 100 may be coupled to more than one switch (for example switch 102A and switch 102B) through PCIe interfaces and uplink ports.

In one embodiment, the switch 102A may be an Open Systems Interconnection (OSI) layer 2 (L2) or layer 3 (L3) networking device. In another embodiment, the switch 102A may be a metadata-driven switch. In yet another embodiment, the switch 102A may be a foreign switch, as the term is defined in U.S. Pat. No. 8,448,238.

In one or more embodiments, the switch processor 122 may be a host processor coupled to the switch fabric 108 of the switch 102A. In this or another embodiment, the switch processor 122 may be any processor configured to execute floating point instructions. In the case where the switch 102A is a metadata-driven switch, the switch processor 102A may be a server grade processor. It is understood by one of ordinary skill in the art that the switch processor 122 depicted in FIG. 1 may be implemented as one or more processor cores of an ASIC embedded in the switch 102A.

As shown in the example embodiment depicted in FIG. 1, the switch processor 122, the switch fabric 108, and the forwarding table 124 may be communicatively coupled via high-speed buses. In one or more embodiments, the switch fabric 108 may be coupled to one or more ingress/egress ports 114A-114N. In this or another embodiment, the one or more ingress/egress ports 114A-114N may be communicatively coupled to one or more data processing devices, computing devices, or networking devices through a network 126. In one embodiment, the network 126 may be a wide area network (WAN), such as the Internet. In another embodiment, the network 126 may be a local area network (LAN), such as an enterprise's intranet. Also, in one embodiment, the ingress/egress ports 114A-114N may be wired Ethernet ports with a minimum line-rate of multiple Gbps. In another embodiment, the ingress/egress ports 114A-114N may be wireless Ethernet ports. As shown in the example embodiment depicted in FIG. 1, network traffic data or network packets (represented by the packets 104) may enter the switch fabric 108 at one of the ingress/egress ports 114A-N and may also exit the switch fabric 108 at one of the ingress/egress ports 114A-N. In one or more embodiments, the packets 104 may be network packets comprising one or more headers and payloads.

In one or more embodiments, the switch fabric 108 may refer to a switch silicon or an ASIC configured to route or forward network traffic. In this or other embodiments, the switch silicon may be any switch ASIC with multiple ports (for example, 64 ports) and the bandwidth to switch multiple Gigabits of traffic per second (for example, 640 Gbps). In one or more embodiments, the forwarding table 124 may be a forwarding information base (FIB), a routing information base (RIB) or routing table, or a media access control (MAC) forwarding table. The forwarding table 124 may be stored in a memory of the switch 102A, where the memory is communicatively coupled to one or more processors of the switch 102A (for example, the switch processor 122). In one embodiment, the forwarding table 124 may be stored in a ternary content addressable memory (T-CAM) of the switch 102A.

Although the present embodiments have been described with reference to a single switch (switch 102A), it will be evident that various modifications and changes may be made to these embodiments and references to the switch 102A may encompass multiple switches (for example, a switch network comprising multiple switches where switch 102A is part of the switch network). In one embodiment, the switch fabric 108 may refer to one switch fabric coupled to another switch fabric (for example, the switch fabric of switch 102A coupled to the switch fabric of switch 102B).

Figure 2:
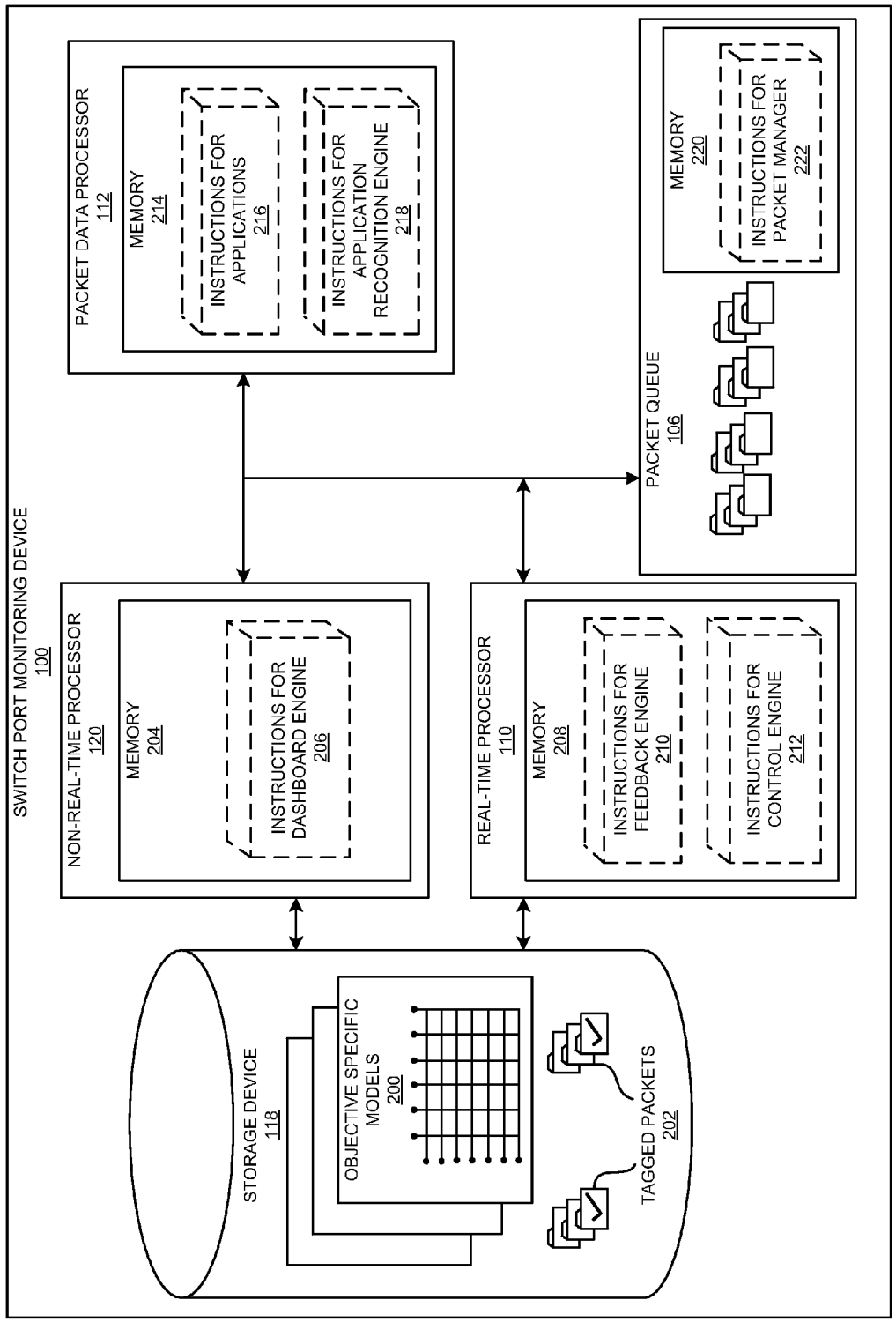
FIG. 2 is a block diagram of a switch port monitoring device, according to one or more embodiments.

Reference is made to FIG. 2, which is a block diagram of the switch port monitoring device 100, according to one or more embodiments. As illustrated in the example embodiment in FIG. 2, the packet queue 106 may comprise a memory 220 that stores instructions for a packet manager 222 application. In addition, the packet data processor 112 may comprise a memory 214 that stores instructions for one or more applications 216 and instructions for an application recognition engine 218. Furthermore, the real-time processor 110 may comprise a memory 208 that stores instructions for a feedback engine 210 and a control engine 212. Moreover, the non-real-time processor may comprise a memory 204 that stores instructions for a dashboard engine 206.

In one embodiment, a plurality of programs may be stored in the plurality of memory devices described herein and shown in FIG. 2, which may then be executed by the plurality of processors described herein and shown in FIG. 2. In one example embodiment, the programs may comprise instructions for the packet manager 222 of the packet queue 106 to queue one or more packets 104 received from the one or more uplink ports 116A-N of the switch fabric 108. In this or other embodiments, the one or more packets received from the one or more uplink ports 114A-114N of the switch fabric 108 may be copies of the packets 104 received at one or more ingress ports (for example, any of the indicated ingress/egress ports 114A-114N) of the switch fabric 108.

The packets 104 residing in the packet queue 106 may be taken off the packet queue 106 and inspected by one or more applications 216 of the packet data processor 112. In one embodiment, the one or more applications 216 may comprise of deep-packet inspection applications. In another embodiment, the application recognition engine 218 may direct packets 104 to specific applications of the packet data processor 112 based on information contained in the header of the packet. In a further embodiment, each of the applications 216 may maintain their own application specific packet queues and the packets 104 may be delivered to such an application specific packet queue before being delivered to the applications 216.

Moreover, the feedback engine 210 of the real-time processor may query the packet manager 222 of the packet queue 106 for a queuing status of the packet queue 106. In one embodiment, the queuing status of the packet queue 106 may comprise data relating to the number of packets currently in the packet queue 106 and the rate of packet data added to the packet queue 106 from the one or more uplink ports 116A-116N. In addition, the feedback engine 210 may also query the monitoring or inspection load of the packet data processor 112 by querying one or more applications 216 or applications specific packet queues of the packet data processor 112. Furthermore, the feedback engine 210 may query the monitoring load of the packet data processor 112 by receiving feedback data from the packet data processor 112 comprising the bits per second analyzed by the packet data processor 112 or the packets per second analyzed by the packet data processor 112.

In one or more embodiments, if the feedback engine 210 of the real-time processor 110 receives feedback data indicating that the maximum monitoring or inspection bandwidth of the packet data processor 112 has been reached or is close to being reached, the real-time processor 110 may determine an objective specific model 200 that optimizes at least one of the number of packets forwarded to the packet queue 106 and the rate of packet data forwarded to the packet queue 106. In one example embodiment, the real-time processor 110 may determine an objective specific model 200 that forwards packets from at least two ingress ports (for example ingress/egress port 114A and ingress/egress port 114B) of the switch fabric 108 to one uplink port (for example, uplink port 116A). It should be apparent to one of ordinary skill in the art of networking that such objective specific models 200 may comprise forwarding schemes that include any combination of ingress ports and uplink ports.

In addition, the real-time processor 110 may store the objective specific model 200 in a storage device 118 communicatively coupled to the real-time processor 110 as a cached objective specific model. In one embodiment, an objective specific model 200 may be stored in the storage device 118 as a cached objective specific model even if not deployed by the control engine of the real-time processor 110. Furthermore, the control engine 212 of the real-time processor 110 may command the switch processor 122 and the switch fabric 108 of the switch 102A to deploy the objective specific model 200. In addition, the control engine 212 may also command the switch processor 122 and the switch fabric 108 to deploy a cached objective specific model if the situation warrants. In one or more embodiments, the control engine 212 of the real-time processor 110 may command the switch processor 122 and the switch fabric 108 to deploy the objective specific model 200 by updating one or more entries in the forwarding table 124 of the switch 102A. In one embodiment, such entries in the forwarding table 124 may be updated continuously and at a fast pace.

In a further embodiment, the control engine 212 of the real-time processor 110 may command the switch processor 122 to tag a packet flow if one or more packets in the packet flow have been analyzed by the packet data processor 112. Once a packet 104 has been tagged by the switch processor 122, the switch processor 122 may instruct the real-time processor 110 to store the tagged packet 202 in the storage device 118. In one or more embodiments, the tagged packets 202 may be an actual copy of the packet tagged by the switch processor 122 or data concerning the tagged packet so that the switch processor 122, the switch fabric 108, the packet queue 106, the real-time processor 110 and/or the packet data processor 112 can more easily identify either the packet or the packet flow comprising the tagged packet once again.

In one or more embodiments, the control engine 212 of the real-time processor 110 may command the switch processor 122 and the switch fabric 108 to exclude any packets tagged by the switch processor 122 or any packet flows containing a packet previously tagged by the switch processor 122 from being forwarded to the packet queue 106. By storing such tagged packets in the storage (and/or memory) devices of the switch port monitoring device 100, the switch port monitoring device 100 can reduce the amount of network traffic (in the form of packets) that will need to be examined by the switch port monitoring device 100. By continuously adding to the cache of tagged packets and by continuously tagging new packets inspected by the packet data processor 112 at a fast pace, the switch port monitoring device 100 may be able to gradually reduce the amount of network traffic that will need to be inspected or examined to only the "delta" traffic (i.e., only the incoming traffic or packets that have not been previously examined). By doing so, the switch port monitoring device 100 may ensure full scanning of all network traffic flowing through the switch or switches coupled to the switch port monitoring device 100.

As indicated in the example embodiment in FIG. 2, the storage device 118 may store one or more objective specific models 200 and packets 104 tagged by the switch processor 122 (shown in FIG. 2 as tagged packets 202). In one or more embodiments, the objective specific models 200 stored in the storage device 118 may be referred to as cached objective specific models. In one embodiment, the storage device 118 may be comprised of a hard disk device, an optical disk device, a flash memory, and/or other similar solid state memory device. In another embodiment, the storage device 118 may be an array of the devices in a computer-readable medium. In other embodiments not shown in FIG. 2, the objective specific models 200 and the tagged packets 202 stored in the storage device 118 may be retrieved and stored temporarily in one or more of the memory devices mentioned heretofore for easy access by the one or more processors depicted in FIG. 2.

In a further embodiment not shown in the figures, the objective specific models 200 and tagged packets 202 may be stored in a storage device that is external to the switch port monitoring device 100. The storage device external to the switch port monitoring device 100 may be a physical device within the local network or a cloud-based device. In one embodiment, the storage device may be comprised of at least one of a hard disk device, an optical disk device, a tape device, a flash memory and/or other similar solid state memory device. In another embodiment, the external storage device may be an array of the devices in a computer-readable medium.

In one or more embodiments, the real-time processor 110 may be configured to generate the objective specific model 200. In one example embodiment, the objective specific model 200 may be metadata models that simulate port configurations (including, but not limited to, ingress/egress ports 114A-114N and uplink ports 116A-116N) of the switch 102A. Such metadata models may be constructed of metadata commands or instructions that simulate possible switch port configurations.

In another embodiment, the objective specific models 200 may comprise of switch port configurations that take into account historical and real-time information related to the status of the network. Such status information may include data concerning current and historical network traffic flows, data concerning users, applications, and/or devices, and/or data concerning the monitoring load or capacity of the packet data processor 112. To obtain such information, the real-time processor 110 may query a network monitor, such as Nagios® or HP OpenView®, for information regarding the status of the network. In addition to Nagios® or HP OpenView®, it may be understood that any software for IT infrastructure monitoring known by those skilled in the art may be used to monitor the network for changes. Moreover, the real-time processor 110 may also retrieve cached objective specific models stored in the storage device 118 to construct new objective specific models.

In a further embodiment, the objective specific models 200 may be the same type of objective models as those described in U.S. patent application Ser. No. 13/861,365. In the broadest sense of the term, an objective specific model may, in one or more embodiments, be any computer generated model that achieves a specific networking objective.

Furthermore, an objective specific model 200 may be determined based on the resources available on a network. For example, if a new switch is added to a switch network and the switch fabric 108 comprises switch fabrics from all such switches, the real-time processor 110 may take into account the additional incoming traffic from the ingress/egress ports of the new switch into its determination. The objective specific models 200 may also be displayed as a single object to a network administrator using a dashboard engine (such as the dashboard engine 206). The objective specific model 200 may be presented to the network administrator through an interface of the dashboard, for example a HTML page or an interface modal window.

One simplified example of an objective specific model 200 (albeit, on a much smaller scale) may be the port configuration tables shown in FIGS. 3A and 3B.

Reference is now made to FIGS. 3A and 3B, which are simplified port configuration tables that represent calculations made by the real-time processor 110 when arriving at an objective specific model 200 that optimizes the number of packets forwarded to the packet queue 106 and/or the rate of packet data forwarded to the packet queue 106, in one or more embodiments. In one or more embodiments, the tables illustrated in FIGS. 3A and 3B may represent simplified objective specific models 200. Tables 300, 302, 304, 306, and 308 represent port configurations of a fictional switch and switch port monitoring device system. In such a system, the switch comprises nine ingress/egress ports (for example ingress/egress ports 114A-114I) and four uplink ports (for example, uplink ports 116A-116N). In all such tables, the maximum uplink rate is the maximum uplink bandwidth of the uplink port(s). In the example embodiment shown in FIGS. 3A and 3B, all four uplink ports have the same uplink bandwidth (for example, 10 Gbps). However, in one or more other embodiments, each of the uplink ports may have a different maximum uplink bandwidth or line rate.

As indicated in the example embodiment depicted in FIG. 3A, table 300 represents the traffic rates of all nine ingress/egress ports as a percentage of the uniform line rate of the uplink ports (for example, 10 Gbps). As indicated in table 302 of FIG. 3A, uplink port 116C may be passing traffic at a rate of 91% its uplink line rate. In this example, a spike in traffic through one of the ingress/egress ports may cause the real-time processor 110 to instruct the packet queue 106 to drop all packets coming in from ingress/egress port 114H, as indicated in table 304, since including such traffic would put the traffic rate of the uplink port at above its line rate. In one or embodiments, the uplink port may be instructed to drop all or a portion of the data packets coming from its least active ingress/egress port. The real-time processor 110 may be instructing the packet queue 106 to drop packets coming in from certain ingress ports at a high rate of repetition.

As indicated in the example embodiment depicted in FIG. 3B, table 306 represents a different set of traffic rates for the nine ingress/egress ports as a percentage of the uniform uplink line rate. As shown in table 308, the real-time processor 110 may instruct the switch fabric 108 (via the switch processor 122) to distribute the traffic rates evenly amongst all of the uplink ports so as to prevent any one uplink port from being over-utilized or under-utilized at any one time. In addition, the real-time processor 110 may instruct the switch fabric 108 to distribute such traffic amongst the various uplink ports at a high rate of repetition.

In one or more embodiments, port configurations or forwarding instructions may also be deployed to other switch devise on a switch network through a variety of interfaces such as application programming interfaces (APIs), file transfer protocols (FTPs), or command-line-interfaces (CLIs) as is known by those skilled in the art.

Figure 4:
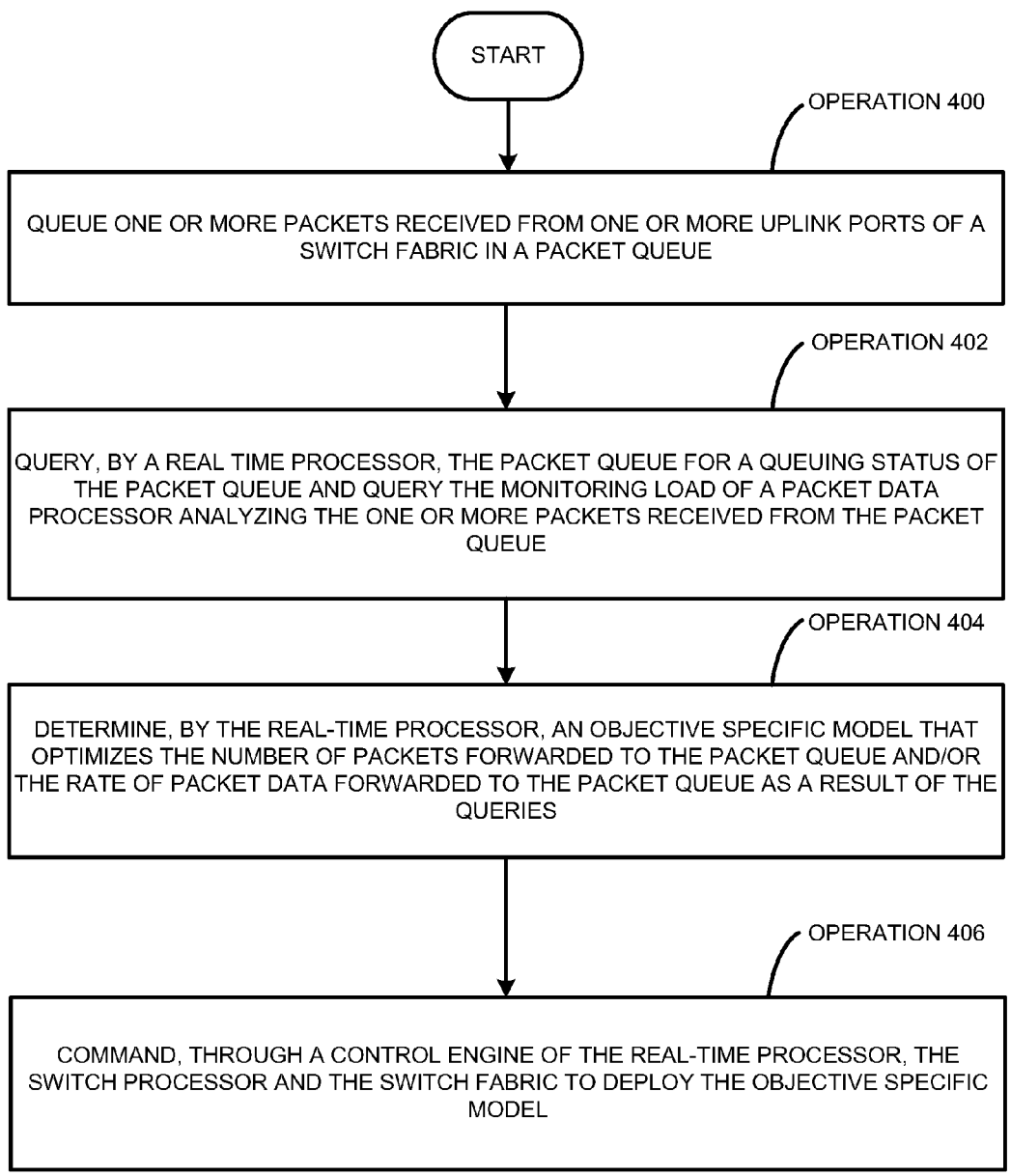
FIG. 4 is a simplified process flow diagram illustrating a method to dynamically monitor one or more switching ports of a networking device, according to one or more embodiments.

Reference is now made to FIG. 4, which is a simplified process flow diagram illustrating a method to dynamically monitor one or more ingress/egress ports 114A-N of a networking device, according to one or more embodiments. Specifically, operation 400 may involve queuing the one or more packets 104 received from the one or more uplink ports 116A-N of the switch fabric 108 in the packet queue 106. Operation 402 may involve querying, by the real-time processor 110, the packet queue 106 and querying the monitoring load of the packet data processor 112 responsible for analyzing the one or more packets 104 received from the packet queue 106. Operation 404 may involve determining, by the real-time processor 110, an objective specific model 200 that optimizes the number of packets 104 forwarded to the packet queue 106 and/or the rate of packet data forwarded to the packet queue 106 as a result of the queries. Finally, operation 406 may involve commanding, through the control engine 212 of the real-time processor 110, the switch processor 122 and the switch fabric 108 to deploy the objective specific model 200.

Figure 5:
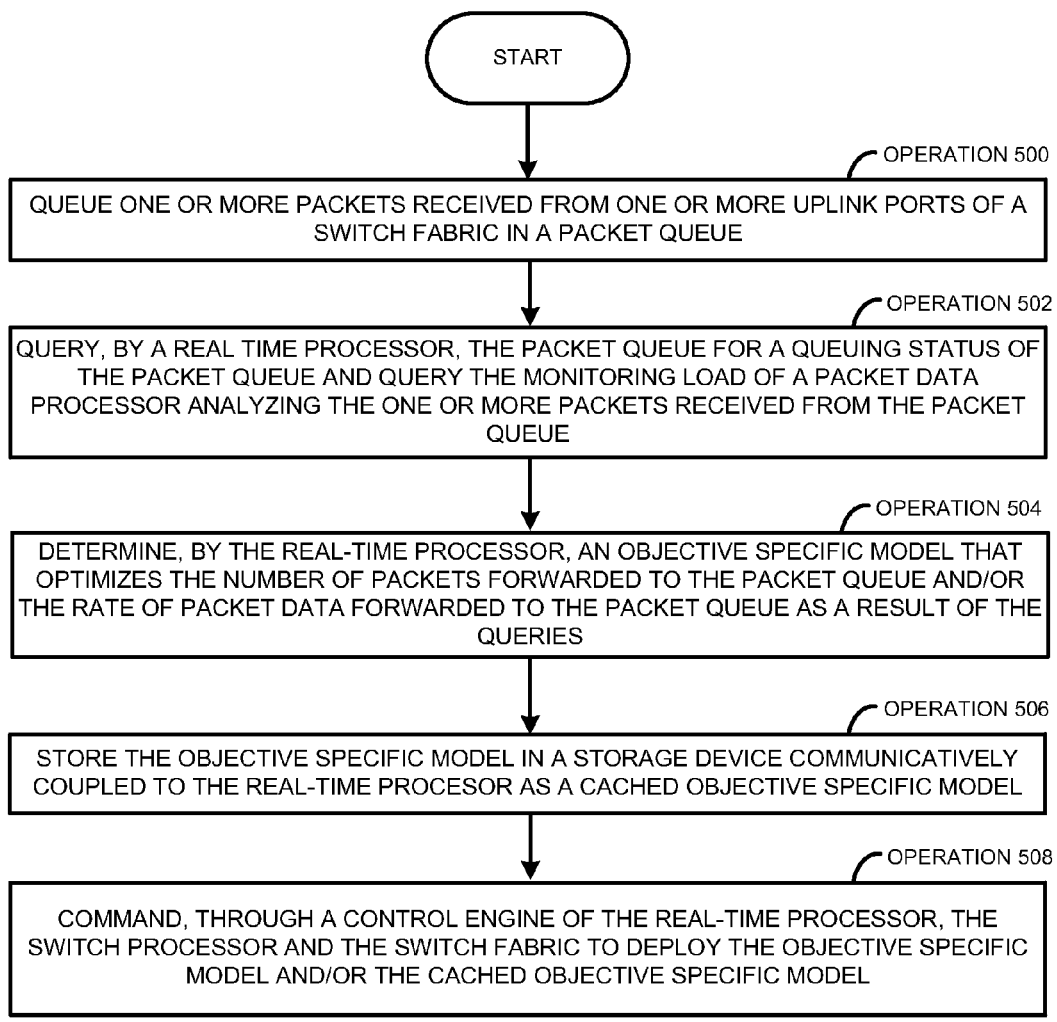
FIG. 5 is a simplified process flow diagram illustrating an additional method to dynamically monitor one or more switching ports of a networking device, according to one or more embodiments.

Reference is now made to FIG. 5, which is a simplified process flow diagram illustrating an additional method to dynamically monitor one or more switching ports of a networking device (for example, switch 102A), according to one or more embodiments. Specifically, operation 500 may involve queuing the one or more packets 104 received from the one or more uplink ports 116A-N of the switch fabric 108 in the packet queue 106. Operation 502 may involve querying, by the real-time processor 110, the packet queue 106 and querying the monitoring load of the packet data processor 112 responsible for analyzing the one or more packets 104 received from the packet queue 106. Operation 504 may involve determining, by the real-time processor 110, an objective specific model 200 that optimizes the number of packets 104 forwarded to the packet queue 106 and/or the rate of packet data forwarded to the packet queue 106 as a result of the queries. Operation 506 may involve storing the objective specific model 200 in the storage device 118 communicatively coupled to the real-time processor 110 as a cached objective specific model. Finally, operation 508 may involve commanding, through the control engine 212 of the real-time processor 110, the switch processor 122 and the switch fabric 108 to deploy the objective specific model 200 and/or the cached objective specific model.

Figure 6:
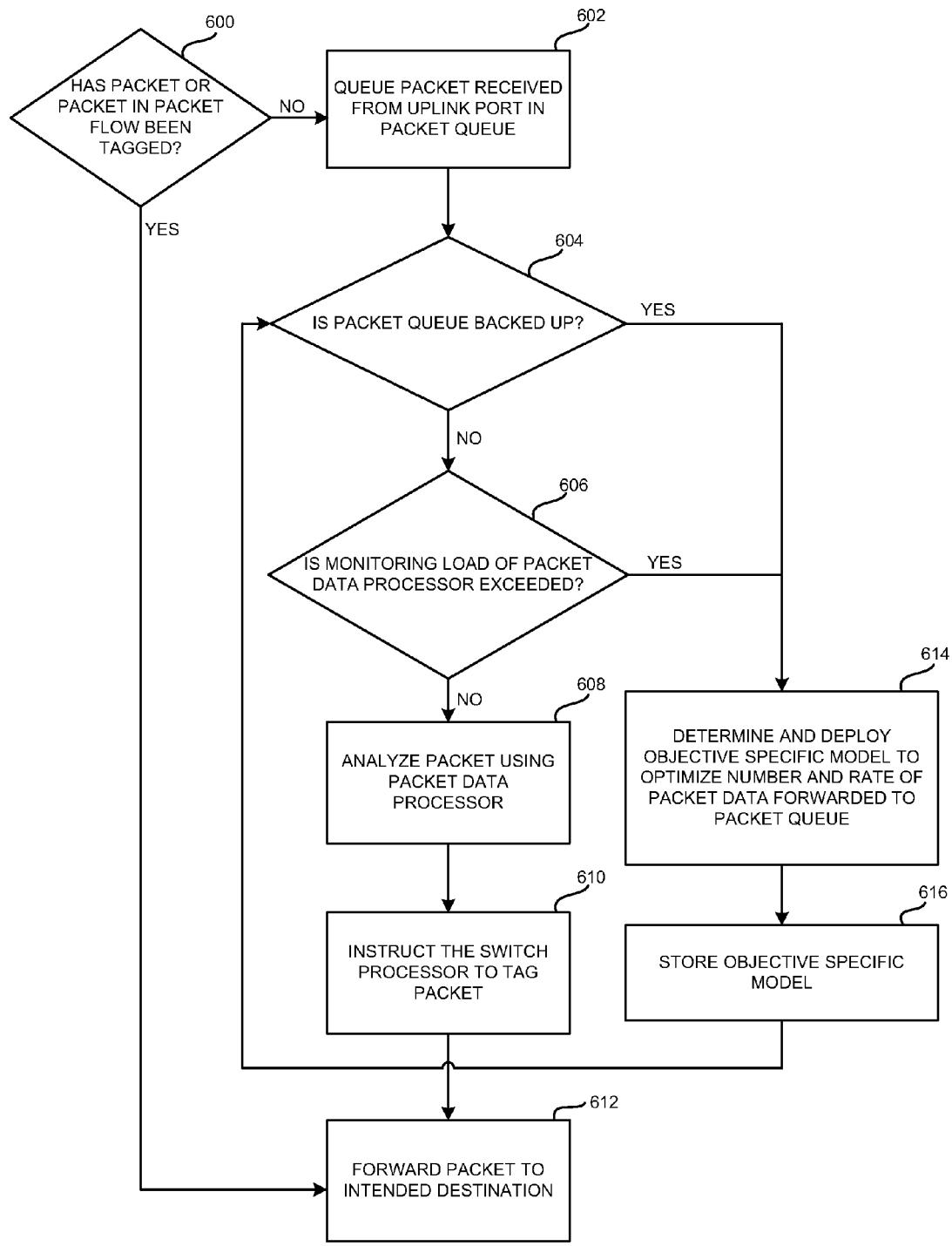
FIG. 6 is a flowchart illustrating certain decisions made by the switch port monitoring device when dynamically monitoring one or more switching ports of a networking device, according to one or more embodiments.

Reference is now made to FIG. 6, which is a flowchart illustrating certain decisions made by the switch port monitoring device 100 when dynamically monitoring one or more switching ports of a networking device, according to one or more embodiments. In one embodiment, operation 600 involves the real-time processor 110 querying the switch processor 122 to see if a packet flow received at any of the ingress ports (for example, ingress/egress port 114A) comprises a packet which has been tagged by the switch processor 122 in the past. If the answer to this inquiry is yes, then the control engine 212 of the real-time processor 110 may send a command to the switch processor 122 and/or the switch fabric 108 to forward the packet flow to its intended destination pursuant to operation 612. In another embodiment not shown in FIG. 6, the real-time processor 110 may send a command to the packet queue 106 (for example, through the packet manager 222) to drop the packet from the packet queue 106. Additionally, the control engine 212 of the real-time processor 110 may also send a command to the switch fabric 108 (via the switch processor 122) to not forward either the tagged packet (or packet flow comprising the tagged packet) or copies of such packets to the packet queue 106. If the answer to this inquiry is no, then, as shown in operation 602, the packet manager 222 may instruct the packet queue 106 to queue the packet received through any of the uplink ports (for example, uplink port 116A).

Operation 604 involves the feedback engine 210 of the real-time processor 110 querying the packet manager 222 to determine if the packet queue 106 is nearing capacity. If the answer to this inquiry is yes, then, as shown in operation 614, the real-time processor 110 may determine and deploy (by the switch processor 122 and the switch fabric 108) an objective specific model 200 that optimizes the number of packets forwarded to the packet queue 106 and/or the rate of packet data forwarded to the packet queue 106. Moreover, as depicted in operation 616, the real-time processor 110 may store the objective specific model 200 in a storage device (such as storage device 118). As shown in the example flowchart in FIG. 6, once the objective specific model 200 has been cached in the storage device, the real-time processor 110 may, once again, undertake operation 600 and query the packet queue 106 for a status update. By doing so, the real-time processor 110 executes a dynamic loop where the packet queue 106 and the packet data processor 112 are continuously being monitored. In one embodiment, this operations loop may be undertaken at a high rate of repetition. If the answer to the inquiry of operation 604 is no, then, as shown in operation 606, the feedback engine 210 of the real-time processor 110 may query the packet data processor 112 to determine whether the monitoring bandwidth of the packet data processor 112 has been exceeded. If the answer to this inquiry is yes, then the real-time processor 110 may, once again, implement operation 614 and operation 616.

If the answer to this inquiry is no, the packet data processor 112 may inspect the packet 104 picked up from the packet queue 106. Once the packet 104 has been examined by the packet data processor 112, the packet data processor 112 may send feedback data to the feedback engine 210 of the real-time processor 110. The control engine 212 of the real-time processor 110 may then instruct the switch processor 122 to tag the packet or to save a copy of the tagged packet in the storage device 118. Finally, operation 612 may involve the control engine 212 of the real-time processor 110 instructing the switch fabric 108 (via the switch processor 122) to forward the packet to its intended destination.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A machine-implemented method to dynamically monitor network traffic, comprising:
    queuing one or more packets received from one or more uplink ports of a switch fabric in a packet queue;
    querying, by a real-time processor, the packet queue for a queuing status of the packet queue and the monitoring load of a packet data processor analyzing the one or more packets received from the packet queue;
    determining, by the real-time processor, an objective specific model that optimizes at least one of the number of packets forwarded to the packet queue and the rate of packet data forwarded to the packet queue as a result of the queries;
commanding, through a control engine of the real-time processor, a switch processor and the switch fabric to deploy the objective specific model;
commanding, through the control engine of the real-time processor, the switch processor to tag a packet flow if one or more packets in the packet flow have been analyzed by the packet data processor; and
commanding, through the control engine of the real-time processor, the switch fabric to exclude at least one of the packet flow and the one or more packets of the packet flow tagged by the switch processor from being forwarded to the packet queue.

2. The method of claim 1, further comprising:
storing the objective specific model in a storage device communicatively coupled to the real-time processor as a cached objective specific model.

3. The method of claim 2, further comprising:
deploying the cached objective specific model to optimize at least one of the number of packets forwarded to the packet queue and the rate of packet data forwarded to the packet queue.

4. The method of claim 1, wherein the switch fabric comprises one switch fabric coupled to another switch fabric.

5. The method of claim 1, wherein the queuing status of the packet queue comprises data relating to the number of packets in the packet queue and the rate of packet data added to the packet queue.

6. The method claim 1, wherein querying the monitoring load of the packet data processor comprises receiving, from the packet data processor, feedback data comprising at least one of the bits per second analyzed by the packet data processor and the packets per second analyzed by the packet data processor.

7. The method of claim 1, wherein commanding the switch processor of the switch fabric to deploy the objective specific model comprises updating one or more entries in a switch forwarding table.

8. The method of claim 7, wherein the objective specific model deployed comprises a networking model that forwards packets from at least two ingress ports of the switch fabric to one uplink port.

9. The method of claim 1, wherein the one or more packets received from the one or more uplink ports of the switch fabric are copies of packets received at one or more ingress ports of the switch fabric.

10. A system to dynamically monitor network traffic, comprising:
a switch port monitoring device comprising a real-time processor, a packet data processor, a packet queue, and a storage device;
one or more switches, coupled to the switch port monitoring device, with at least one of the one or more switches comprising a switch processor, a switch fabric, one or more ingress/egress ports coupled to the switch fabric, and one or more uplink ports coupling the switch fabric to the packet queue; and
a plurality of programs, wherein the plurality of programs are stored in a plurality of memory devices and executable by at least one of the aforementioned processors with the plurality of programs comprising:
instructions to queue one or more packets received from the one or more uplink ports in the packet queue,
instructions to query, by the real-time processor, the packet queue for a queuing status of the packet queue and the monitoring load of the packet data processor analyzing the one or more packets received from the packet queue,
instructions to determine, by the real-time processor, an objective specific model that optimizes at least one of the number of packets forwarded to the packet queue and the rate of packet data forwarded to the packet queue as a result of the queries,
instructions to command, through a control engine of the real-time processor, the switch processor and the switch fabric to deploy the objective specific model;
instructions to command, through the control engine of the real-time processor, the switch processor to tag a packet flow if one or more packets in the packet flow have been analyzed by the packet data processor; and
instructions to command, through the control engine of the real-time processor, the switch fabric to exclude at least one of the packet flow and the one or more packets of the packet flow tagged by the switch processor from being forwarded to the packet queue.

11. The system of claim 10, further comprising:
instructions to store the objective specific model in a storage device communicatively coupled to the real-time processor as a cached objective specific model.

12. The system of claim 11, further comprising:
instructions to deploy the cached objective specific model to optimize at least one of the number of packets forwarded to the packet queue and the rate of packet data forwarded to the packet queue.

13. The system of claim 10, wherein the switch fabric comprises one switch fabric coupled to another switch fabric.

14. The system of claim 10, wherein the queuing status of the packet queue comprises data relating to the number of packets in the packet queue and the rate of packet data added to the packet queue.

15. The system claim 10, wherein the instructions to query the monitoring load of the packet data processor further comprises instructions to receive, from the packet data processor, feedback data comprising at least one of the bits per second analyzed by the packet data processor and the packets per second analyzed by the packet data processor.

16. The system of claim 10, wherein instructions to command the switch processor of the switch fabric to deploy the objective specific model further comprises instructions to update one or more entries in a switch forwarding table.

17. The system of claim 16, wherein the objective specific model deployed comprises a networking model that forwards packets from at least two ingress ports of the switch fabric to one uplink port.

18. The system of claim 10, wherein the one or more packets received from the one or more uplink ports of the switch fabric are copies of packets received at one or more ingress ports of the switch fabric.

* * * * *